United States Patent [19]
Fletcher

[11] 4,363,086
[45] Dec. 7, 1982

[54] LUMINAIRE

[75] Inventor: Thomas A. Fletcher, Dana, N.C.

[73] Assignee: General Electric Company, Schenectady, N.Y.

[21] Appl. No.: 839,550

[22] Filed: Oct. 5, 1977

[51] Int. Cl.[3] .................................................. B60Q 1/00

[52] U.S. Cl. .................................... 362/368; 362/263; 362/371; 362/396

[58] Field of Search ............... 362/263, 265, 261, 441, 362/396, 216, 396 X, 368, 370, 371 X; 174/61, 63

[56] References Cited

U.S. PATENT DOCUMENTS

| | | | |
|---|---|---|---|
| 1,871,847 | 8/1932 | Green | 362/441 |
| 3,233,094 | 2/1966 | Foulds | 362/396 |
| 3,284,624 | 11/1966 | Brasty | 362/263 |
| 3,433,887 | 3/1969 | Driskell | 174/63 |

*Primary Examiner*—Donald P. Walsh
*Attorney, Agent, or Firm*—Ernest W. Legree; Philip L. Schlamp; Fred Jacob

[57] ABSTRACT

Luminaire assembly with readily detachable parts. Luminaire comprises top ballast housing, intermediate ballast and slipfitter mounting plate, and lower optical assembly with associated slipfitter housing attached to ballast housing and mounting plate by readily detachable clamp band. Optical assembly, which includes dome-shaped reflector and lamp mounting assembly, is suspended with associated slipfitter housing from lug on mounting plate when clamp band is detached.

9 Claims, 6 Drawing Figures

LUMINAIRE

The present invention relates to luminaires, and more particularly to a luminaire of high intensity discharge type suitable for street, highway and area lighting purposes.

It is an object of the invention to provide a luminaire of the above type which permits ready access to the interior thereof without the use of tools.

It is another object of the invention to provide a luminaire of the above type comprising an assembly of a ballast housing, slipfitter and optical assembly which enables ready separation of the optical assembly from the ballast housing without electrical hazard.

Still another object of the invention is to provide a luminaire of the above type which has improved structural integrity due to mating parts with large surface areas.

A further object of the invention is to provide a luminaire of the above type which facilitates assembly, installation and maintenance thereof.

Other objects and advantages will become apparent from the following description and the appended claims.

With the above objects in view, the present invention in one of its aspects relates to a luminaire comprising, in combination, an upper housing having an open bottom, mounting plate means arranged closing the open bottom of the upper housing and adapted to have electrical operating components mounted on the upper side thereof and covered by the upper housing, slipfitter means secured to the underside of the mounting plate means, combined slipfitter housing and optical means arranged below the mounting plate means covering the underside thereof and forming with the mounting plate means and the upper housing an annular joint therebetween, and readily detachable attaching means surrounding the annular joint and holding the parts thereof in assembly.

The invention will be better understood from the following description taken in conjunction with the accompanying drawings, in which:

FIG. 1 is a view in elevation, partly in section, of a luminaire embodying the present invention;

FIG. 1*a* is a fragmentary view of the luminaire lamp socket mounting showing an alternative arrangement with respect to that shown in FIG. 1;

Figure 1:
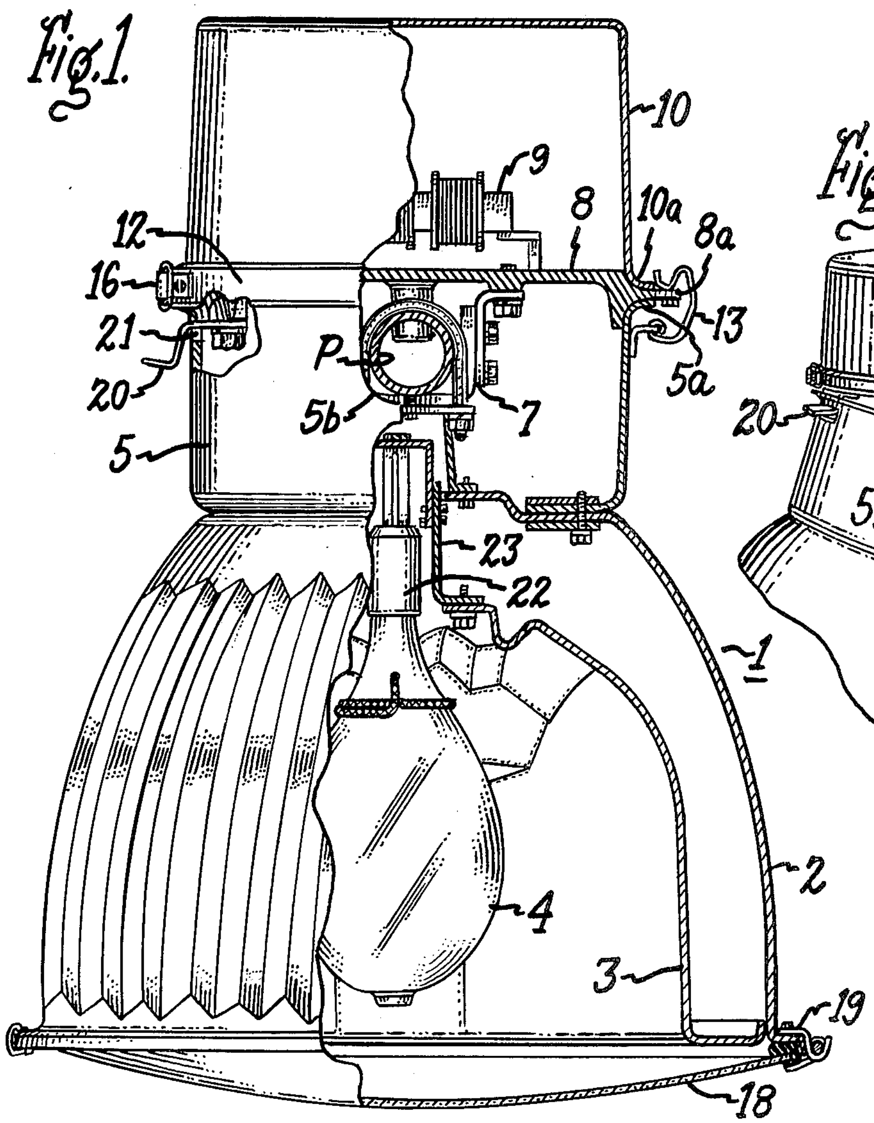

Referring now to the drawings, and particularly to FIG. 1, there is shown a luminaire having an optical assembly 1 including a dome-shaped reflector 2 enclosing an auxiliary inner reflector 3 and lamp 4, which is typically of high intensity gaseous discharge type. The open bottom of main reflector 2 is closed by a light transmitting closure 18, such as a plain or refractive glass member, secured to the rim of reflector 2 by a clamp band 19, or other suitable means. Whereas main reflector 2 is typically of a form to produce symmetrical distribution of reflected light from lamp 4, auxiliary reflector 3 provides asymmetrical light distribution and in a usual arrangement is mounted for rotation within main reflector 2. Details of such a mounting are disclosed and claimed in co-pending application Ser. No. 848,544 - Henderson et al, filed Nov. 4, 1977, and assigned to the same assignee as the present invention.

Lamp socket 22 in the embodiment illustrated in FIG. 1 is secured by adjustable lamp positioning device 23 to auxiliary reflector 3. The details of construction and operation of such a lamp positioning device are disclosed and claimed in co-pending application Ser. No. 846,735 - Henderson et al, filed Oct. 31, 1977, and assigned to the same assignee as the present invention.

Figure 1A:
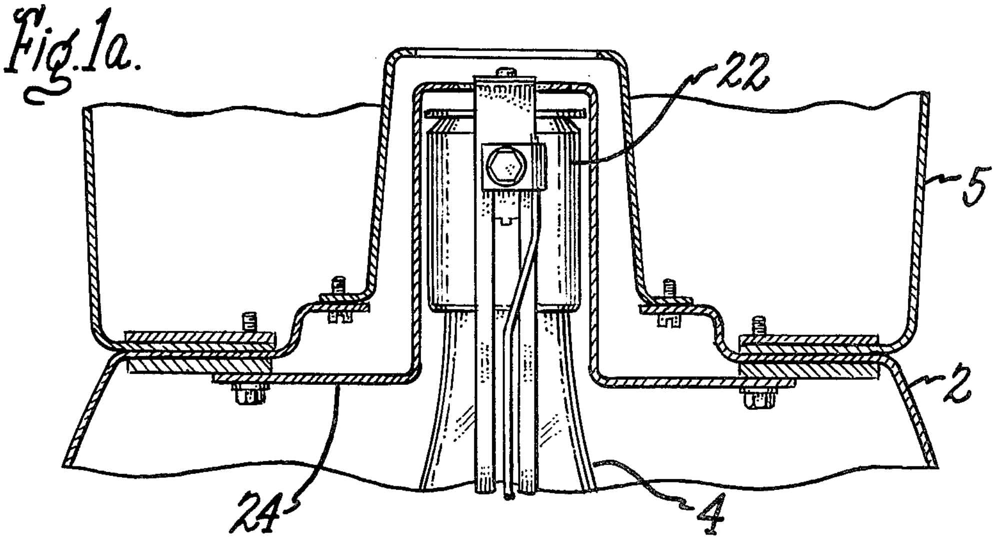

Asymmetric reflector 3 may be dispensed with if asymmetric distribution of light is not desired. In such case, the particular lamp positioning device 23 is replaced by a conventional socket bracket 24 secured to the top of main reflector 2, as shown in FIG. 1*a*.

Secured at the top of optical assembly 1 by bolts 6 or the like (see FIG. 1) is slipfitter housing 5 which is cylindrical in shape and has an open top defined by an outwardly flaring rim 5*a*. A U-shaped cutout 5*b* is provided in slipfitter housing 5 to allow passage of a support pipe P on which the luminaire is mounted by means of adjustable slipfitter or pipe clamp 7.

Arranged covering the open top of slipfitter housing 5 is a circular disc-like mounting plate 8 seated on rim 5*a* with a correspondingly shaped lower mating surface on its periphery. Slipfitter 7 is secured to the underside of mounting plate 8, so as to be positioned within slipfitter housing 5. Details of the structure and operation of slipfitter 7 are more fully disclosed in co-pending application Ser. No. 840,069 - Fletcher, filed Oct. 6, 1977, and assigned to the same assignee as the present invention.

Mounted on the upper side of mounting plate 8 are electrical operating components such as ballast transformer 9 for operating discharge lamp 4. Arranged on top of mounting plate 8 and enclosing the electrical components thereon is ballast housing 10 which is similar in shape to slipfitter housing 5 with a closed top and open bottom and has a flaring rim 10*a* at its bottom seated on the upper peripheral mating surface of mounting plate 8.

Figure 3:
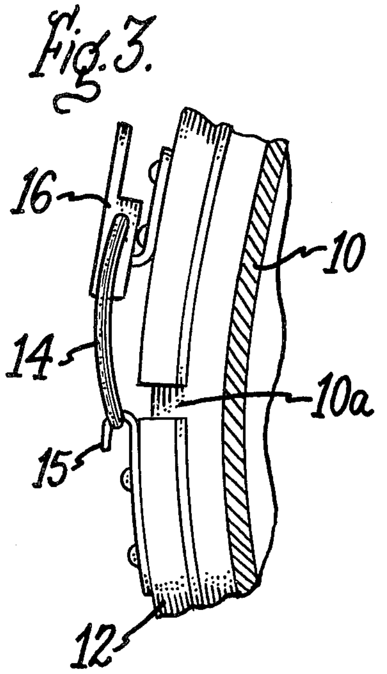
FIGS. 3 and 4 are respectively a top plan view and an elevational view in enlarged scale of the latch portion of the clamp band fastener of the luminaire.
Figure 5:
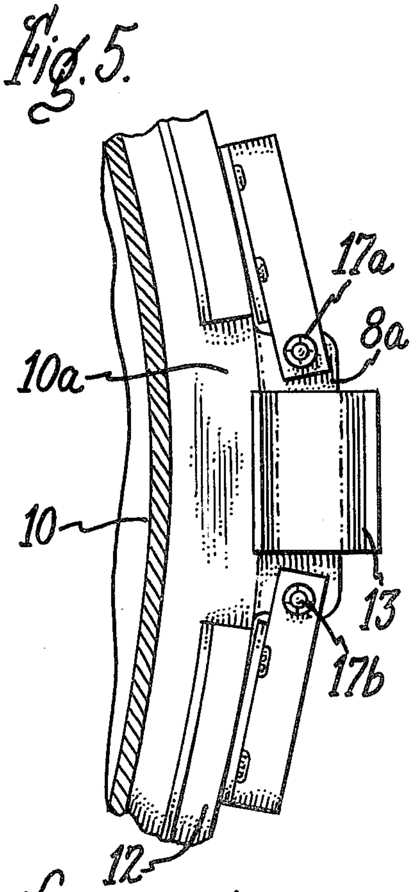
FIGS. 5 and 6 are similar views of the hinge portion of the luminaire clamp band fastener.
Figure 4:
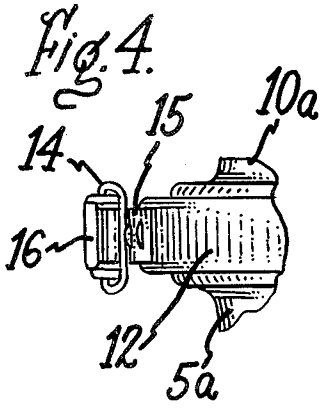
Figure 6:
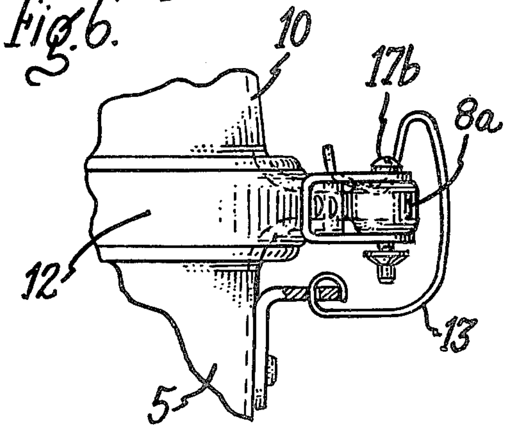

Embracing the annular joint thus formed by rims 5*a*, 10*a* and the intervening periphery of mounting plate 8 and locking the parts in assembly is clamp band fastener 12 (see FIGS. 3–6) which is formed of two sections respectively hinged on lug 8*a* projecting from mounting plate 8 (see FIG. 5) and latched together at their free ends as seen in FIG. 3. The latching means, of conventional type, comprises latch hook 15 secured to one clamp band section and engaging U-shaped latch spring 14 pivotally connected to latch lever 16 secured to the other clamp band section. At the hinged side of clamp band 12 is arranged spring clamp 13 of generally U-shape hingedly secured to slipfitter housing 5, as seen in FIG. 6, and resiliently bearing on the upper side of lug 8*a*.

Figure 2:
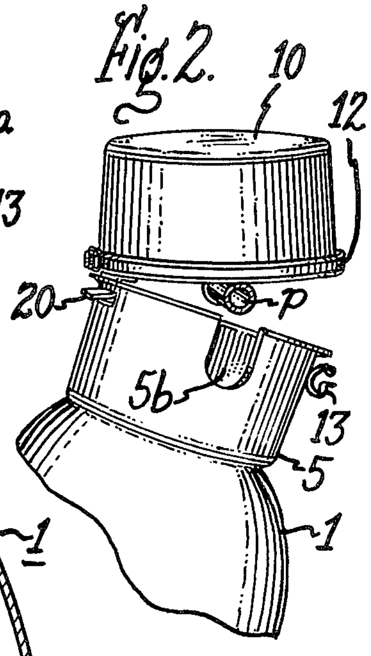
FIG. 2 is an elevational view in reduced scale of a portion of the luminaire of FIG. 1, showing the luminaire in partly detached condition.

An S-shaped support lug 20, as seen in FIG. 1, connected at one end to the underside of mounting plate 8 projects outwardly through slot 21 in slipfitter housing 5. When clamp band 12 is loosened and spring clamp 13 is disengaged from lug 8*a*, the combined slipfitter housing and optical assembly 1, 5 may be lowered without hindrance by support pipe P by virtue of cutout 5*b*, and it hangs down from support lug 20 as shown in FIG. 2, thereby providing access to the electrical connection (not shown) between lamp socket 22 and electrical operating components within ballast housing 10.

To install the luminaire, the following procedure may typically be used. Mounting plate 8 with electrical ballast and other electrical components attached thereto is arranged on support pipe P which is inserted into slipfitter 7, and with ballast housing 10 placed on top of mounting plate 8, slipfitter 7 is clamped onto support pipe P after the ballast housing and mounting plate assembly has been suitably leveled. The combined slipfitter housing and optical assembly 1, 5 is then suspended from support lug 20 as shown in FIG. 2 and the necessary electrical connections are made between the lamp socket and the ballast housing receptacle (not shown). The slipfitter housing and optical assembly 1, 5 is then lifted into position against mounting plate 8, spring clamp 13 is pressed into clamping position on lug 8*a*, and clamp band 12 is then closed and latched, completing the assembly.

The disclosed construction is such that, after the luminaire is installed, removal of the slipfitter housing - optical assembly or the ballast housing, or both, may be readily carried out without the use of tools.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

I claim:

1. A luminaire comprising, in combination, an upper housing having an open bottom, mounting plate means arranged closing the open bottom of said upper housing and adapted to have electrical operating components mounted on the upper side thereof and covered by said upper housing, slipfitter means secured to the underside of said mounting plate means, combined slipfitter housing and optical means arranged below said mounting plate means covering the underside thereof and forming with said mounting plate means and said upper housing an annular joint therebetween, and readily detachable attaching means surrounding said annular joint and holding said upper housing, said mounting plate means and said combined slipfitter housing and optical means in assembly.

2. A luminaire as defined in claim 1, and first coacting readily separable means on said mounting plate means and said combined slipfitter housing and optical means for suspending the latter means in partially detached condition from said mounting plate means.

3. A luminaire as defined in claim 2, said first coacting readily separable means comprising first lug means projecting from said mounting plate means and slot means in the upper portion of said combined means through which said first lug means freely passes, whereby said combined means may be suspended from said first lug means.

4. A luminaire as defined in claim 3, and second coacting readily separable means on said mounting plate means and said combined means for holding the latter means in assembly with said mounting plate means in conjunction with said first coacting means when said detachable attaching means is detached from said joint.

5. A luminaire as defined in claim 4, said second coacting means comprising second lug means projecting from said mounting plate means remote from said first lug means and clamp means secured to said combined means engageable with said second lug means.

6. A luminaire as defined in claim 1, said readily detachable attaching means comprising clamp band means having a pair of separable band portions.

7. A luminaire as defined in claim 5, said readily detachable attaching means comprising clamp band means having a pair of separable band portions each hinged at one end on said second lug means and having latching means at the other end thereof.

8. A luminaire as defined in claim 2, with slipfitter means comprising pipe clamp means defining a lateral passage for receiving a support pipe, said combined means comprising a slipfitter housing having a side wall defining an open top and formed in its side wall adjacent its top with an opening aligned with said lateral passage of said pipe clamp means for entry of the support pipe therein and for permitting lowering of said combined means without hindrance by the support pipe.

9. A luminaire as defined in claim 1, said combined means comprising an upper slipfitter housing and a lower dome-shaped reflector secured together, and lamp support means arranged in said combined means for mounting a lamp within said reflector.

* * * * *